US007419406B2

(12) United States Patent
Brochu et al.

(10) Patent No.: US 7,419,406 B2
(45) Date of Patent: Sep. 2, 2008

(54) BATHING UNIT CONTROLLER

(75) Inventors: Christian Brochu, Quebec (CA); Daniel Gaudreau, St-Jean-Chrysostome (CA); Pascal Recoura, Quebec (CA); Benoit Laflamme, Quebec (CA)

(73) Assignee: Gecko Alliance Group Inc., Quebec (CA)

( * ) Notice: Subject to any disclaimer, the term of this patent is extended or adjusted under 35 U.S.C. 154(b) by 0 days.

(21) Appl. No.: 11/072,335

(22) Filed: Mar. 7, 2005

(65) Prior Publication Data

US 2005/0151425 A1 Jul. 14, 2005

Related U.S. Application Data

(63) Continuation-in-part of application No. 10/693,868, filed on Oct. 28, 2003, now Pat. No. 6,929,516.

(51) Int. Cl.
*H01R 13/64* (2006.01)
*H02J 4/00* (2006.01)

(52) U.S. Cl. ....................... 439/677; 439/680; 439/661; 307/149

(58) Field of Classification Search ................. 439/677, 439/680, 681; 307/149, 11, 112, 116; 361/104, 361/42, 45, 115
See application file for complete search history.

(56) References Cited

U.S. PATENT DOCUMENTS 2,720,038 A * 10/1955 Clark ......................... 434/343
3,085,221 A 4/1963 Kelly
3,609,636 A 9/1971 La Grange et al.
4,159,862 A 7/1979 Funck et al.
4,296,992 A 10/1981 Gallagher
4,350,409 A 9/1982 Kato et al.
4,386,333 A 5/1983 Dillan
4,758,174 A 7/1988 Michaels et al.
5,245,221 A * 9/1993 Schmidt et al. ............. 307/112
5,254,019 A 10/1993 Noschese
5,370,556 A 12/1994 Olsson
5,401,181 A 3/1995 Wilson
5,421,746 A 6/1995 David
5,520,555 A 5/1996 Taylor
5,685,727 A 11/1997 Cairns
5,733,148 A 3/1998 Kaplan et al.
5,844,763 A * 12/1998 Grace et al. ................. 361/111
6,128,196 A * 10/2000 Hoyle et al. ................ 361/752
6,218,846 B1 4/2001 Ludwig et al.
6,379,169 B1 4/2002 Corona
6,407,469 B1 * 6/2002 Cline et al. ................... 307/11
6,428,345 B2 * 8/2002 Sawayanagi et al. ........ 439/456
6,495,931 B2 * 12/2002 Loyd et al. .................. 307/149

(Continued)

FOREIGN PATENT DOCUMENTS

DE 101 13 223 A1 10/2002

(Continued)

*Primary Examiner*—Chandrika Prasad

(57) ABSTRACT

A controller suitable for use in controlling components in a bathing unit is provided. The controller includes a controller body having a back surface and a front surface generally opposed to the back surface. The front surface includes a plurality of connector interfaces each being adapted for receiving a connector associated to a respective bathing unit component. A control circuit is positioned within the controller body for selectively providing electrical power to respective bathing unit components connected through the plurality of connector interfaces.

37 Claims, 6 Drawing Sheets

U.S. PATENT DOCUMENTS

| | | | | |
|---|---|---|---|---|
| 6,540,549 | B2 | 4/2003 | Rupert | |
| 6,643,108 | B2 * | 11/2003 | Cline et al. | 361/42 |
| 6,752,665 | B2 * | 6/2004 | Kha et al. | 439/668 |
| 2002/0089235 | A1 | 7/2002 | Loyd et al. | |
| 2002/0089236 | A1 | 7/2002 | Cline et al. | |
| 2004/0070911 | A1 | 4/2004 | Tran | |

FOREIGN PATENT DOCUMENTS

| | | | |
|---|---|---|---|
| EP | 0 033 286 | A2 | 8/1981 |
| GB | 930509 | A | 7/1963 |

* cited by examiner

BATHING UNIT CONTROLLER

CROSS-REFERENCE TO RELATED APPLICATIONS

This application is a continuation-in-part of U.S. patent application Ser. No. 10/693,868 entitled "BATHING UNIT CONTROLLER AND CONNECTOR SYSTEM THEREFOR", filed on Oct. 28, 2003 now U.S. Pat. No. 6,929,516 by Christian BROCHU et al. and presently pending. The contents of the above noted document are incorporated herein by reference.

FIELD OF THE INVENTION

The present invention relates to controllers suitable for use in bathing units and, more particularly, to controllers having a plurality of connectors for connection to bathing unit components.

BACKGROUND

A bathing unit, such as a spa, typically includes various components such as a water holding receptacle, pumps to circulate water in a piping system, a heating module to heat the water, a filter system, an air blower, an ozone generator, a lighting system. Such a bathing unit also includes a control system for activating and managing the various parameters of the bathing unit components. Other types of bathing units having similar components include, for instance, whirlpools, hot tubs, bathtubs, therapeutic baths, and swimming pools.

Typically, the control system of a bathing unit includes a controller to which are connected the various bathing unit components. The controller is adapted to control the power supplied to each one of the connected components. The controller receives input signals from various input devices, such as for example a plurality of sensors that monitor the various components of the bathing unit and from a control panel allowing a user to control various operational settings of these components. In response to the input signals, the controller activates, or deactivates, the various bathing unit components by supplying power, or ceasing to supply power, to the components.

Usually, different components in a given bathing unit have different operating power requirements. For instance, some of the bathing unit components may require to be powered by way of a 120 volts (V) AC voltage source, while other bathing unit components may require to be powered via a 240 volts (V) AC voltage source. Similarly, different bathing unit components may be designed to operate with different maximum current draws. The current draw to operate the various bathing unit components may range, for example, from 0.1 amps (A) for an ozone generator to 20 amps (A) for a large pump. Moreover, the current draw to operate two bathing unit components of a same type, such as two pumps or two heating modules, may also be different for the two components. For instance, one pump may require a current draw of 12 amps (A) to operate, while another pump may require a current draw of 20 amps (A) to operate.

FIG. 1*a* shows a sample controller 100 suitable for use in a bathing system. As depicted, the controller 100 includes a controller body coupled to a heater 122, the controller body having an access panel 112 connected thereto. FIG. 1*b* shows the same controller 100 as FIG. 1*a* with the access panel 112 opened. The controller body defines an enclosure in which a control circuit 108 is located. The controller 100 also includes a set of connectors 102 positioned along the periphery of the controller body and adapted for receiving complementary connectors associated to respective bathing unit components. As depicted, the set of connectors 102 are in communication with the control circuit 108 through electric connection wires 110. In use, the control circuit 108 is adapted for selectively providing electrical power to respective bathing unit components connected through the set of connectors 102. A plurality of power connection elements 106 and fuses 104 are also located with the enclosure defined by the controller body. The power connection elements 106 are for coupling the controller to an external electrical power source (not shown in the figure).

In order to accommodate bathing unit components having different power requirements, each connector in the set of connectors 102 is adapted to supply power to that particular component in accordance with its power requirements. To achieve this, each connector usually includes a set of electrical contact elements, at which a certain voltage or current output will be available. For example, if a bathing unit includes one component having operating power requirements of 120 volts (V) and 12 amps (A) and another component having operating power requirements of 240 volts (V) and 20 amps (A), the controller will thus be configured to include one connector having contact elements at which an output of 120 volts (V) and 12 amps (A) will be available and another connector having contact elements at which an output of 240 volts (V) and 20 amps (A) will be available.

A first deficiency associated to controllers of the type shown in FIGS. 1*a* and 1*b* is that a bathing unit installer or service technician runs the risk of connecting a given bathing unit component to a wrong connector, i.e. to a connector not intended to be connected to that given component. For instance, in the above example, the component with operating power requirements of 120 volts (V) and 12 amps (A) runs the risk of being connected to the controller connector at which an output of 240 volts (V) and 20 amps (A) will be available.

Another deficiency associated to controllers of the type shown in FIGS. 1*a* and 1*b* is that the control circuit 108 is often damaged during servicing by a technician. For example, the electric connection wires 110 between the set of connectors 102 and the control circuit 108 are often inadvertently disconnected during handling. Similarly, electrical components on the control circuit 108 are sometimes damaged when fuses 104 are replaced or electrical connections established. In addition, since the controller 100 is usually positioned in proximity to water, when the access panel 112 is open, water sometimes comes into contact with the electronic components contained in the controller body and damages those components. Such incidences usually translate into a greater number of service calls to the bathing unit vendor (or bathing unit controller vendor) which therefor increases the costs of providing bathing unit controllers. Furthermore, even though the failure of the bathing unit controller originated from the technician's mishandling of the equipment, the result is a perception of lack of reliability of the bathing unit controller.

Against the background described above, it appears that there is a need in the industry to provide a controller suitable for a bathing unit that alleviates at least in part the problems associated with existing controllers.

SUMMARY

In accordance with a first broad aspect, the invention provides a controller suitable for use in controlling bathing unit components in a bathing unit system. The controller comprises a controller body and a control circuit positioned within the controller body. The controller body has a back surface and a front surface generally opposed to the back surface, where the front surface includes a plurality of connector interfaces. Each connector interface is adapted for receiving a connector associated to a respective bathing unit component. In use, the control circuit is adapted for selectively providing electrical power to respective bathing unit components connected through the plurality of connector interfaces.

In accordance with a specific example, the control circuit is mounted to an electronic circuit board including printed conductor traces. At least one of the connector interfaces includes a conductive member establishing a direct contact with the printed conductor traces. The direct contact may be established by any suitable way such as, for example, through a soldered connection between the printed conductor traces and the conductive member.

In accordance with a specific example of implementation, the controller further comprises a set of instructions positioned on the front surface of the controller body. The set of instructions provides guidance as to how to couple the plurality of connector interfaces to respective connectors associated to bathing unit components.

In accordance with a specific example of implementation, the back surface and the front surface are connected such as to form a first portion and a second portion, where the second portion may be accessed independently from the first portion. The second portion includes an access panel providing access to the second portion. The first portion is sealed such as to prevent access thereto by a technician. Optionally, the first portion is sealed such as to reduce the likelihood of water entering the first portion.

In accordance with a specific example of implementation, at least some connector interfaces include descriptive indicia providing guidance in locating corresponding connectors associated to bathing unit components. The descriptive indicia may include alphanumeric characters, color indicia or any other suitable form of indicia. In a non-limiting example, the color indicia allow effecting connections between the plurality of connector interfaces and the connectors associated to bathing unit components on the basis of a color code.

In accordance with another broad aspect, the invention provides a controller for use in controlling bathing unit components in a bathing unit system. The controller comprises a controller body including a back surface and a front surface generally opposed to the back surface. The controller also comprises a plurality of connector interfaces positioned on the controller body, each connector interface of the plurality of connector interfaces being adapted for receiving a connector associated to a respective bathing unit component. The controller also comprises a set of instructions positioned on the front surface of the controller body, the set of instructions providing guidance as to how to couple the plurality of connector interfaces to respective connectors associated to bathing unit components. The controller also comprises a control circuit positioned within the controller body. In use the control circuit is adapted for selectively providing electrical power to respective bathing unit components connected through the plurality of connector interfaces.

In accordance with a specific implementation, at least some of the plurality of connector interfaces are positioned on the front surface of the controller body. In accordance with a non-limiting example of implementation, at least some of the plurality of connector interfaces are positioned on the periphery of the controller body.

In accordance with yet another broad aspect, the invention provides a controller for use in controlling bathing unit components in a bathing unit system. The controller comprises a controller body, a plurality of connector interfaces positioned on the controller body and a control circuit. The controller body includes a first portion and a second portion, wherein the second portion may be accessed independently from the first portion. Each connector interface of the plurality of connector interfaces is adapted for receiving a connector associated to a respective bathing unit component. In use the control circuit being adapted for selectively providing electrical power to respective bathing unit components connected through the plurality of connector interfaces.

In accordance with a specific implementation, the second portion includes an access panel providing access to the second portion. The first portion is sealed such as to prevent access thereto by a technician. Optionally, the first portion is sealed such as to reduce the likelihood of water entering the first portion.

In accordance with yet another broad aspect, the invention provides a controller for use in controlling bathing unit components in a bathing unit system. The controller comprises a controller body, a plurality of connector interfaces positioned on the controller body and a control circuit. Each connector interface of the plurality of connector interfaces is adapted for receiving a connector associated to a respective bathing unit component. At least some connector interfaces of the plurality of connector interfaces include descriptive indicia providing guidance in locating corresponding connectors associated to bathing unit components. In use the control circuit is adapted for selectively providing electrical power to respective bathing unit components connected through the plurality of connector interfaces.

In accordance with a specific implementation, the controller body includes a back surface and a front surface generally opposed to the back surface, the plurality of connector interfaces being positioned on the front surface of the controller body.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of the embodiments of the present invention is provided herein below, by way of example only, with reference to the accompanying drawings, in which.

Figure 1A:
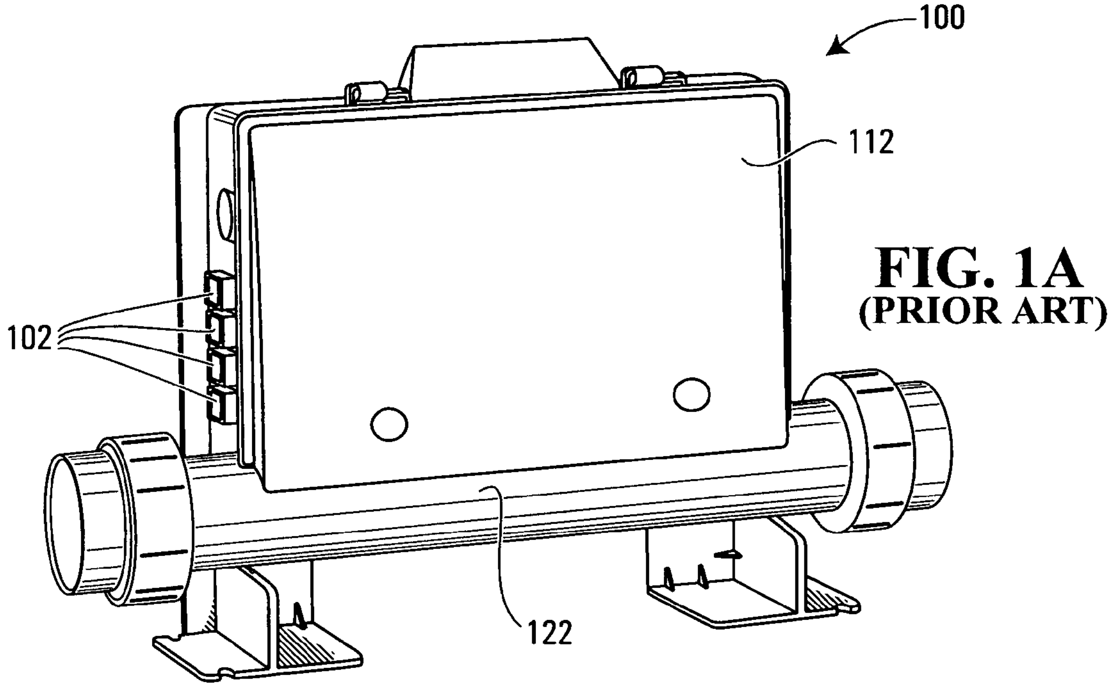
FIG. 1A (PRIOR ART)
FIGS. 1*a* and 1*b* show schematic representations of a prior art bathing unit controller.
Figure 1B:
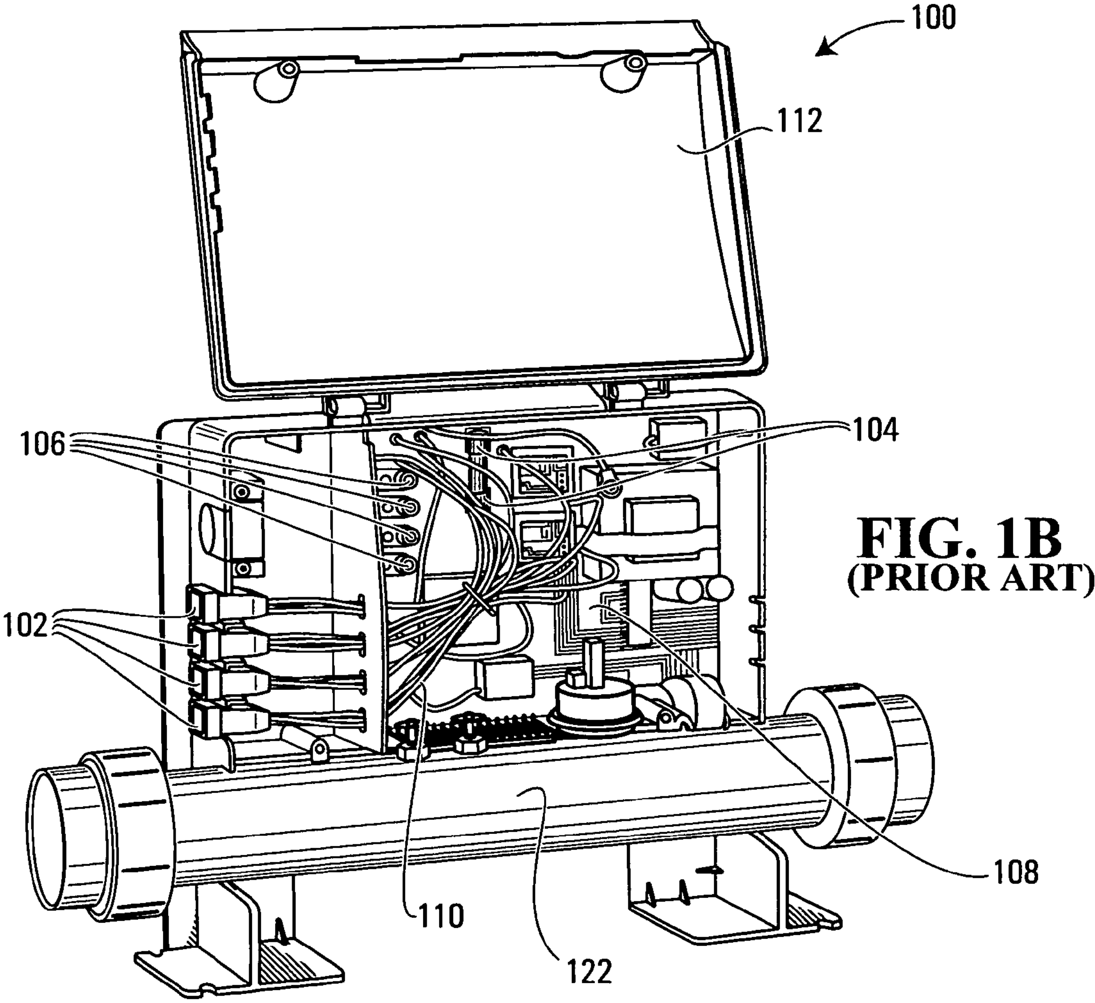
FIG. 1B (PRIOR ART)

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The description below is directed to a specific implementation of the invention in the context of a spa system. It is to be understood that the term "spa system", as used for the purposes of the present description, refers to spas, whirlpools, hot tubs, bathtubs, therapeutic baths, swimming pools and any other type of bathing unit that can be equipped with a control system for controlling various operational settings.

Figure 2:
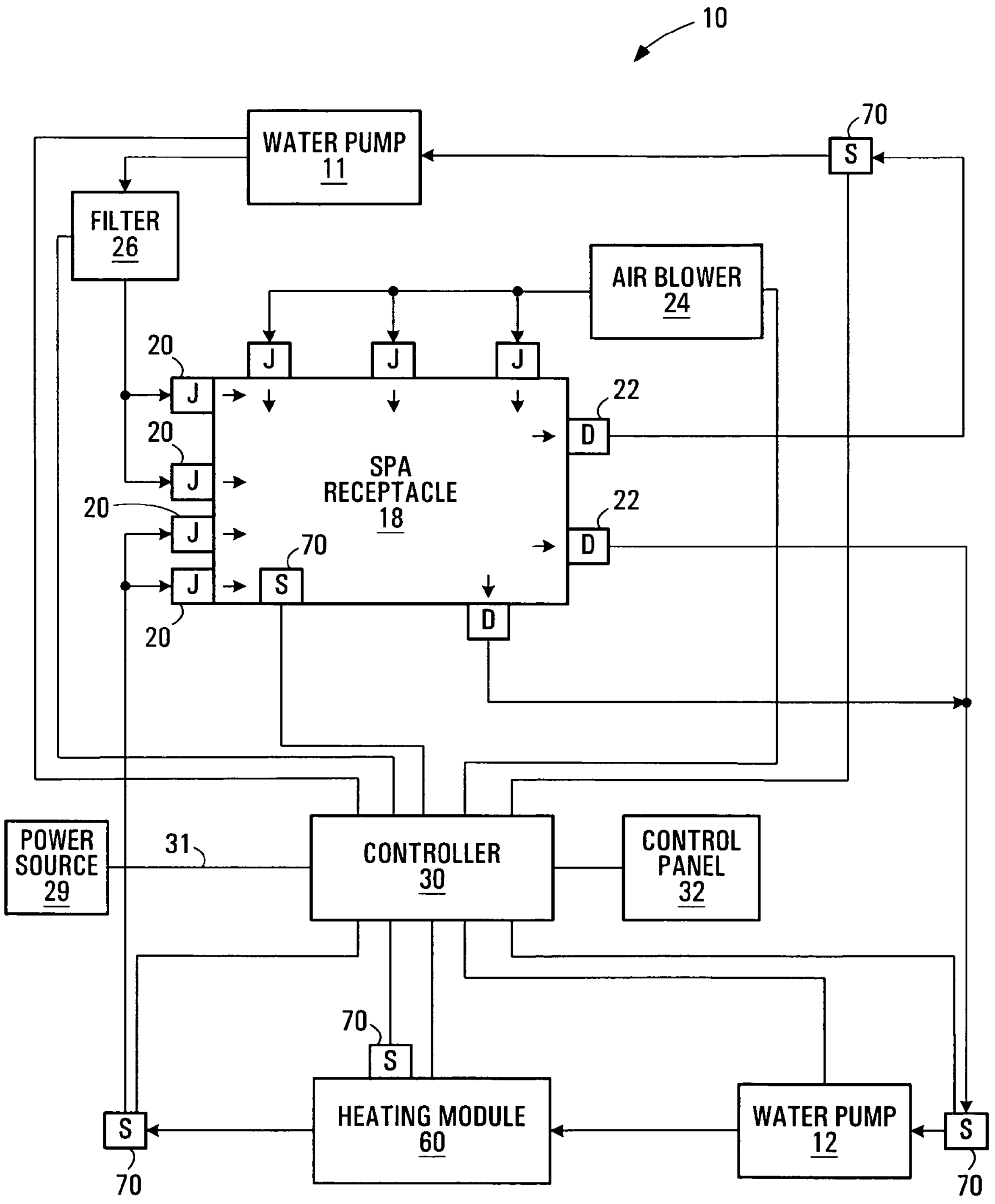
FIG. 2 shows a block diagram of a spa system equipped with a bathing unit controller in accordance with a specific example of implementation of the present invention.

FIG. 2 illustrates a block diagram of a spa system 10 in accordance with a specific example of implementation. The spa system 10 includes a spa receptacle 18 for holding water, a plurality of jets 20, a set of drains 22 and a control system. In the non-limiting embodiment shown, the control system includes a control panel 32, a controller 30, and a plurality of sensors 70 that monitor the various components of the spa. For example, the sensors 70 may include temperature and liquid level sensors to respectively monitor the water temperature and water level at various locations in the spa system 10.

In the specific embodiment shown in FIG. 2, the spa system 10 further includes a plurality of spa components in the form of a heating module 60, two water pumps 11 & 12, a filter 26 and an air blower 24. It should be understood that the spa system 10 could include more or less spa components without departing from the spirit of the invention. For example, although not shown in FIG. 2, the spa system 10 could include a lighting system for lighting up the water in the receptacle 18.

In normal operation, water flows from the spa receptacle 18, through drain 22 and is pumped by water pump 12 through heating module 60 where the water is heated. The heated water then leaves the heating module 60 and re-enters the spa receptacle 18 through jets 20. In addition, water flows from the spa receptacle 18, through drain 22 and is pumped by water pump 11 through filter 26. The filtered water then re-enters the spa receptacle 18 through jets 20. Water can flow through these two cycles continuously while the spa system 10 is in operation. The air blower 24 is operative for delivering air bubbles to the spa receptacle 18.

The control system is operative for controlling the various components of the spa system 10. The control panel 32 of the control system is typically in the form of a user interface that allows a user to enter commands for controlling the various operational settings of the spa. Some non-limiting examples of operational settings of the spa include temperature control settings, jet control settings, and lighting settings. In a non-limiting embodiment where the spa is connected to entertainment and/or multimedia modules, the operational settings of the spa may also include audio settings and video settings, amongst others. Consequently, the expression "operational settings", for the purpose of the present invention, is intended to cover operational settings for any suitable equipment that can be used by a spa bather.

The control system receives electrical power from an electric power source 29 that is connected to the controller 30. The controller 30 is then able to control the distribution of power supplied to the various spa components on the basis of control signals received from the various sensors 70 and the control panel 32 in order to cause the desired operational settings to be implemented.

The power source 29 supplies the controller 30 with any suitable power service suitable for residential or commercial use, via service wiring 31. In a non-limiting implementation, the power source 29 can supply 240 volts (V) rms to the controller 30 via service wiring 31. In an alternative non-limiting implementation, the power source 29 can supply 120 volts (V) rms to the controller 30 via service wiring 31. It is to be appreciated that other voltage supply values, for example depending on geographical location, are possible without detracting from the spirit of the invention.

A specific example of implementation of the controller 30 will now be described with reference to FIGS. 3*a*, 3*b*, 3*c* and 3*d*.

As shown, the controller 30 for use in controlling bathing unit components in a bathing unit system comprises a controller body having a back surface 301 (shown in FIG. 3*c*) and a front surface 300 generally opposed to the back surface 301. The controller body includes an enclosure defining a space between the front surface 300 and the back surface 301 (shown in FIG. 3*c*).

The controller body may be comprised of any suitable material including but not limited to cast aluminum, magnesium, sheet metal (cold roll) and molded plastic.

The front surface 300 includes a plurality of connector interfaces 34A-34I and 302A-302F, each connector interface being adapted for receiving a corresponding connector associated to a respective bathing unit component (not shown), to a sensor or to the controller interface. The controller 30 also includes a printed circuit board (not shown) positioned within the controller body and on which is mounted a control circuit. In use, the control circuit selectively provides electrical power to respective bathing unit components connected through the plurality of connector interfaces 34A-34I and 302A-302F.

Advantageously, by having the connector interfaces 34A-34I and 302A-302F appearing on the front surface 300 of the controller body, rather than on the periphery thereof, a greater ease in making the connection with the bathing unit component connectors is provided to the spa technician.

In addition, by having the connector interfaces 34A-34I and 302A-302F appearing on the front surface of the controller 30, more surface area is available for the layout of the connector interfaces. This allows space to provide additional connector interfaces if required.

Figure 3A:
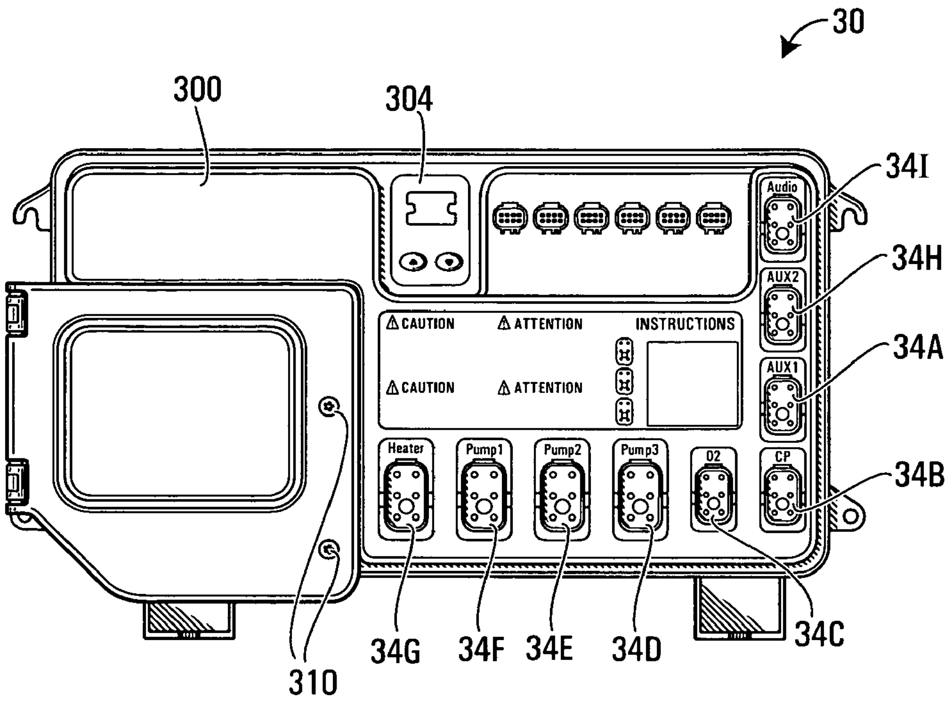
FIG. 3*a* shows a bathing controller suitable for use in the spa system shown in FIG. 2 in accordance with a specific example of implementation of the present invention.
Figure 3B:
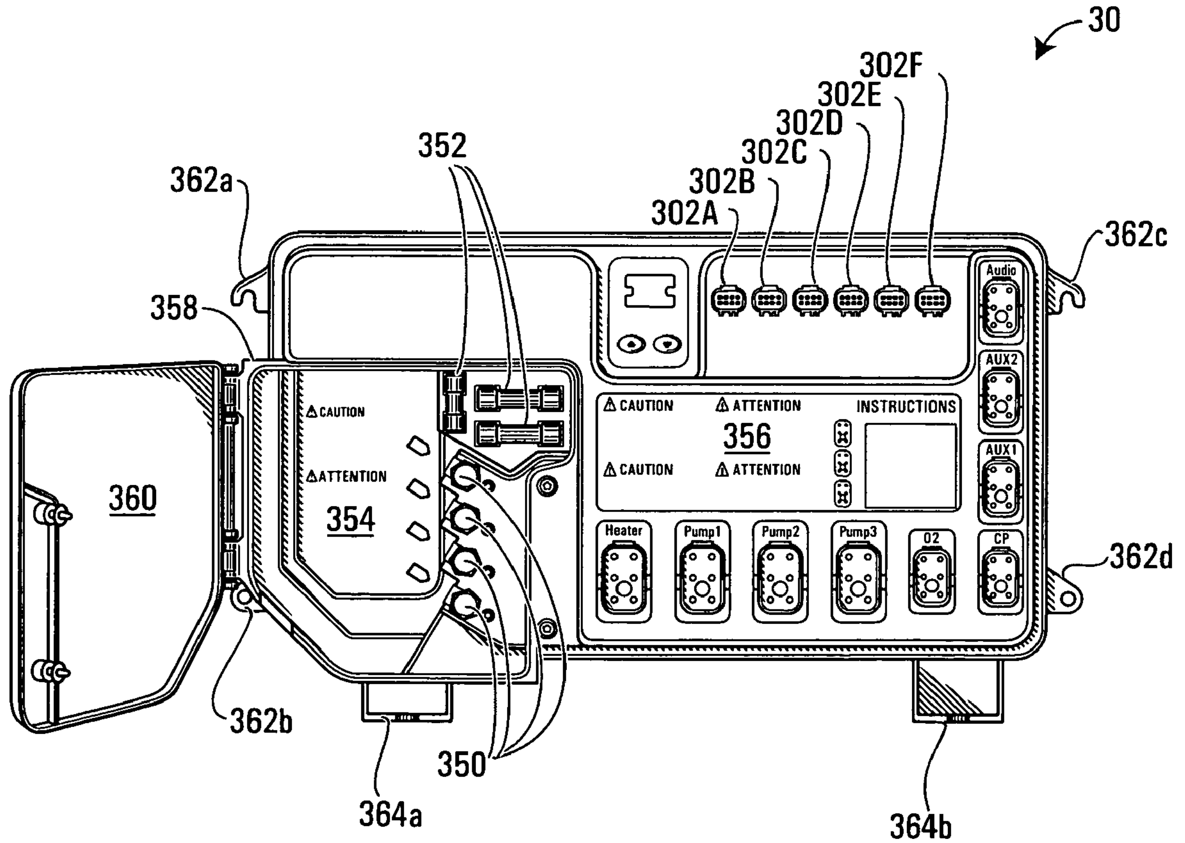
FIG. 3*b* shows the bathing controller shown in FIG. 3*a* with an open access panel showing a terminal block in accordance with a specific example of implementation of the present invention.
Figure 3C:
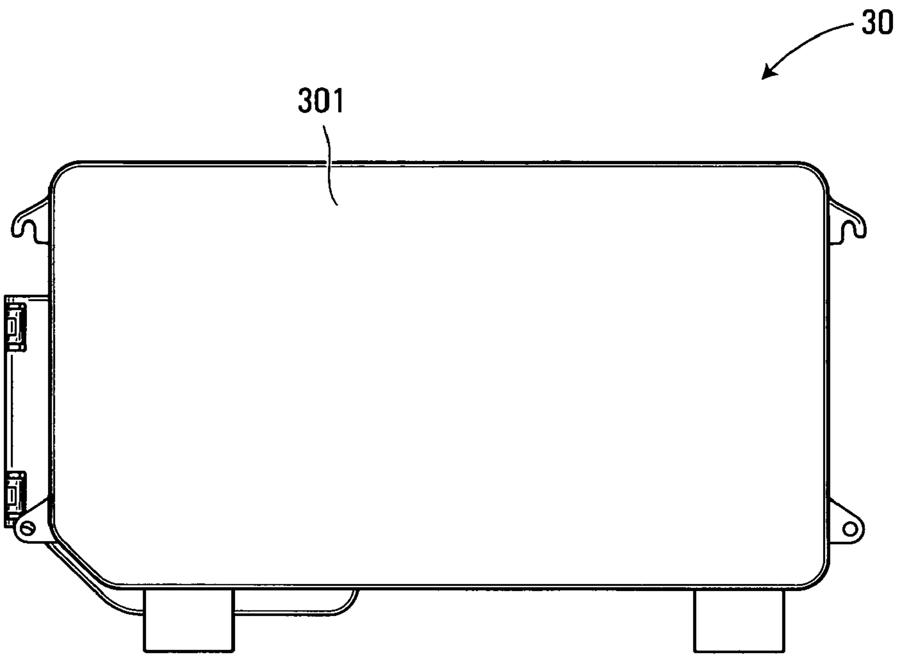
FIG. 3*c* shows the back surface of the bathing controller depicted in FIG. 3*a* in accordance with a specific example of implementation of the present invention.

In a specific implementation, as shown in FIG. 3*b*, the controller 30 comprises a set of fastener receiving members 362*a*-362*d* and 364*a*-364*b* adapted for receiving fasteners for coupling the controller 30 to a desired surface. As depicted, fastener-receiving members 362*a*-362*d* are positioned around the periphery of the controller body and, when used with suitable fasteners, allow the controller to be secured to a surface opposed to the back surface of the controller body, such as a wall for example. Fastener-receiving members 364*a*-364*b* are positioned around the periphery of the controller body in the bottom portion of the controller body and, when used with suitable fasteners, allow the controller to be secured to a surface below the controller body. In yet another implementation, not shown in the figures, fastener-receiving members are positioned around the periphery of the controller body in the top portion of the controller body and, when used with suitable fasteners, allow the controller to be secured to a surface above the controller body. In a specific non-limiting example of implementation, the controller 30 is adapted to be positioned under the skirt of the bathing unit.

Each one of the connector interfaces 34A-34I and 302A-302F, comprises a plurality of contact elements. In a specific implementation, the contact elements are electrically connected to electrical circuitry, such as a printed-circuit board or other suitable control circuit element, that is mounted in the controller 30 and that is adapted to convert the power received from the electric power source 29 into a particular voltage and/or current applied to each one of the contact elements.

Figure 3D:
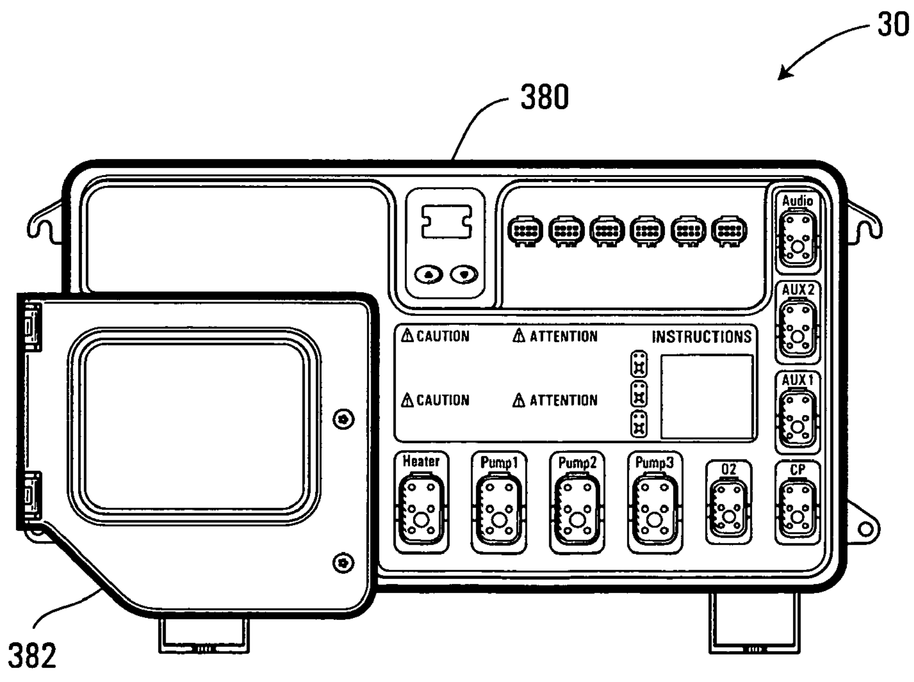
FIG. 3*d* shows the bathing controller shown in FIG. 3*a* showing a first portion and a second portion in accordance with a specific example of implementation of the present invention.
Figure 4:
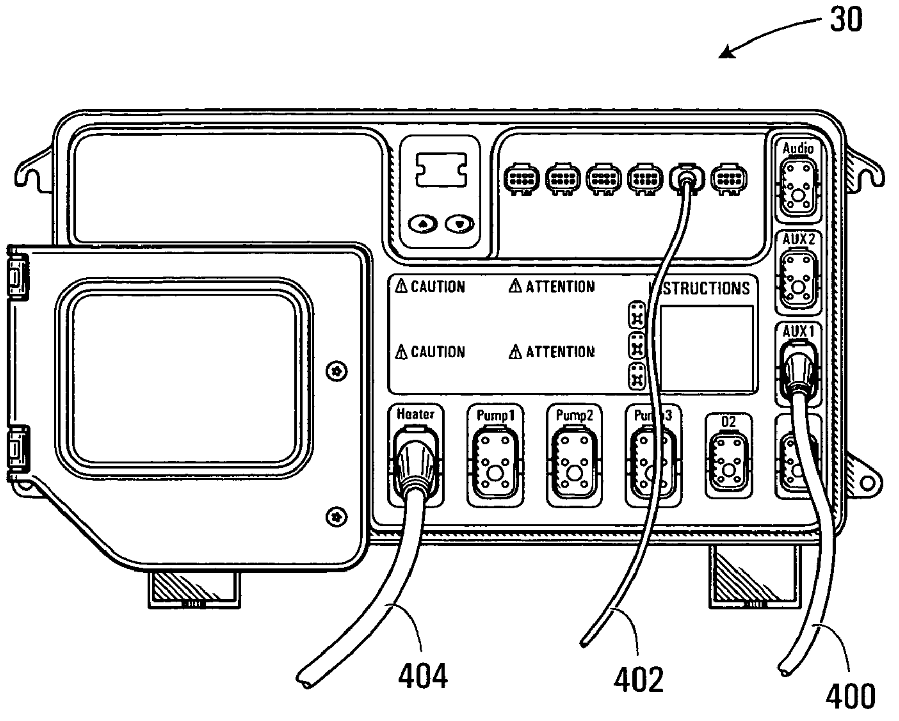
FIG. 4 shows the bathing controller shown in FIG. 3*a* with connectors associated to respective bathing unit components connected thereto in accordance with a specific example of implementation of the present invention.

In the specific example of implementation shown in FIGS. 3*a*, 3*b* and 3*d* the controller 30 comprises a plurality of connectors 34A-34I which are adapted for providing electrical power to respective spa components and electrical circuitry (not shown in the figure) adapted for controlling the supply of power to the plurality of connectors 34A-34I. In a specific implementation, the spa components include, for example, pumps, a heating module, an air blower, an audio system, and a lighting system. Although FIGS. 3*a*, 3*b*, 3*d* show the controller 30 as including nine connectors 34A-34I for supplying electrical power to nine spa components, it should be understood that the controller 30 could include any suitable number of connectors 34 for providing electrical power to desired number of spa components without detracting from the spirit of the invention. Connector interfaces 302A-302F are optional low voltage connections, which may be used for various peripheral components such as control panels, light outputs, external I/O controls and infrared receiver input amongst others.

Figure 6:
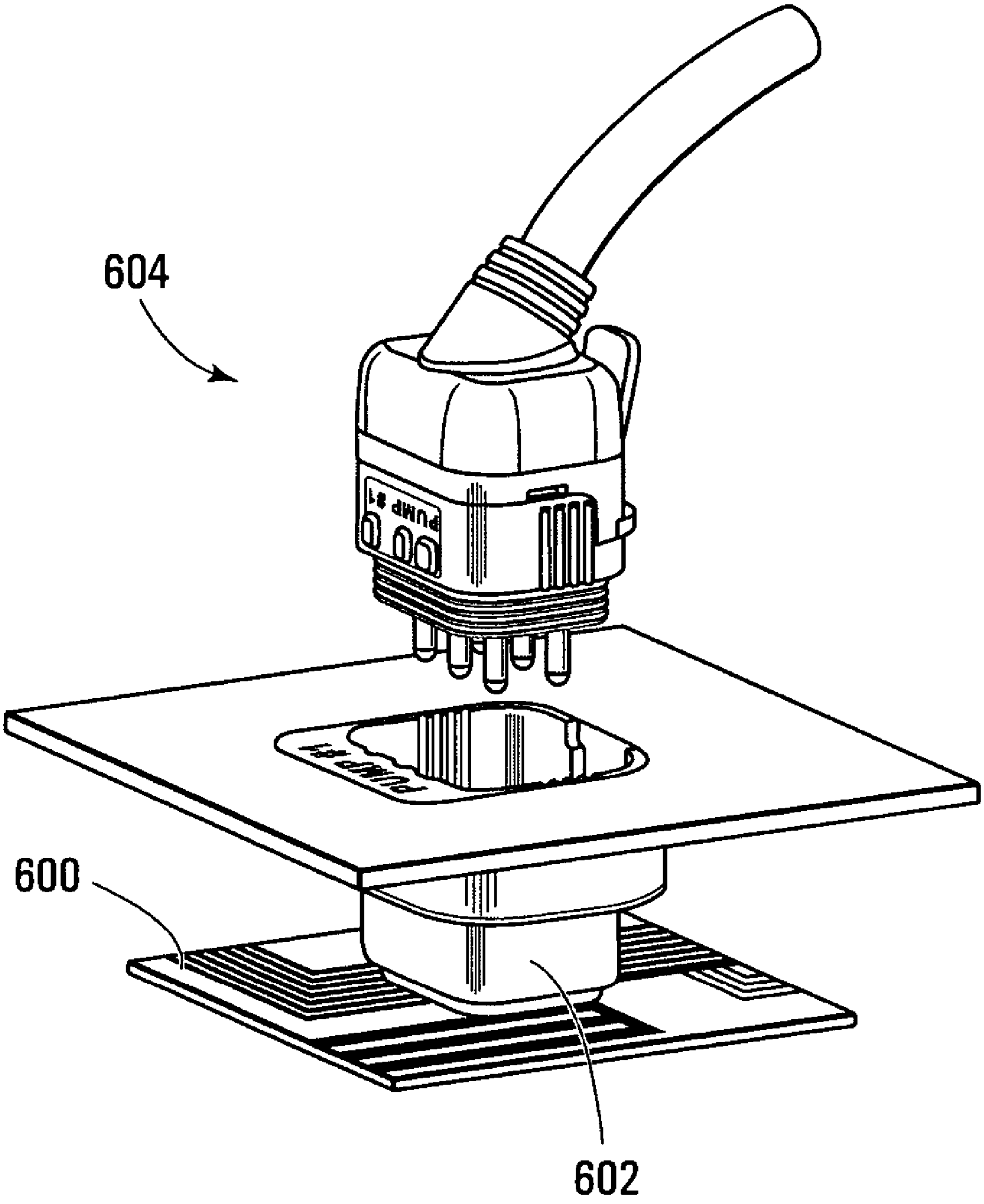
FIG. 6 shows a portion of an electronic circuit board a connector interface and a connector in accordance with a specific embodiment of the present invention.

The connector interfaces 34A-34I and 302A-302F include contact elements which are electrically connected to a printed circuit board (not shown) positioned between the front surface and the back surface of the controller body. The printed circuit board receives power via service wiring 31 from a conventional electric power source 29. The printed circuit board includes a variety of electrical components and patterns of printed wiring conductor traces that interconnect the variety of electrical components and the service wiring 31. Each one of the contact elements of the connector interfaces 34A-34I and 302A-302F may be directly connected to a respective one of the printed conductor traces, for example, by a soldered connection, or any other suitable method known in the art. Alternatively, each contact element may be connected to a respective one of the printed conductor traces of the printed circuit board via a respective conductor wire extending from the contact element to the printed conductor trace. The printed circuit board is designed to either directly route, or convert and route directly or through a relay, the power received from service wiring 31 such as to achieve the particular voltage or current expected to be made available at each contact element of the connector interfaces 34A-34I and 302A-302F. In a specific non-limiting implementation, the service wiring 31 includes a first line "line 1", a second line "line 2", a Neutral and earth ground conductor connected to 120/240 V single phase supply system. FIG. 6 of the drawings shows a portion of a printed circuit board 600 to which is directly coupled a connector interface 602 in accordance with a non-limiting example of implementation of the invention. The connector interface is adapted for receiving therein connector 604.

The printed circuit board includes a control circuit element connected to the variety of electrical components on the board and adapted to receive signals from various input devices of the spa system 10, such as the spa control panel 32 and various spa sensors 70 (shown in FIG. 2). The control circuit element is adapted to control the operation of the various electrical components of the printed circuit board on the basis of the signals received from the various input devices such as to enable or disable the particular voltage or current expected to be available at any one of the connector interfaces 34A-34I and 302A-302F. For example, in a typical interaction, a user of the spa enters commands via the spa control panel 32 in order to activate a particular spa component. The control circuit element, upon receiving signals generated by the control panel 32 on the basis of the entered commands, controls the various electrical components of the printed circuit board such as to enable the connector interfaces 34A-34I and 302A-302F associated with the particular spa component. Similarly, if a water level sensor was to generate a signal upon detecting an unacceptable water level in a particular spa component such as the pump 12 or the heating module 60 (shown in FIG. 2), the control circuit element, upon receiving the generated signal, could control the various electrical components of the printed circuit board such as to disable the voltage and/or current available at the contact elements of the connector interface associated with the pump 12 or the heating module 60.

With reference to FIGS. 3*a*, 3*b* and 3*d*, in a non-limiting example of implementation, the controller 30 further includes an error diagnostic window 304. The error diagnostic window 304 provides a visual display of errors associated with the controller 30 and generated by diagnostic functionality implemented by the control circuit. As depicted, the error diagnostic window 304 includes a display area and scrolling keys allowing users to visualize a set of errors. In a non-limiting example of implementation, the visual display of errors is done in the form of error codes where each type of error is associated to a respective error code. For example, a defective heater element may be associated to error code "H1" and a defective pump may be associated to an error code "P1". Any suitable method for detected errors in the spa system and conveying that information to the spa user may be used here. The specific manner in which the errors are detected and generated is beyond the scope of the present application and as such will not be described further here. For addition information on error detection in a spa, the reader is invited to refer to U.S. patent application Ser. No. 10/768,130 filed on Feb. 2, 2004 and assigned to the same assignee as the present application.

In a specific example of implementation, the controller 30 further includes a set of instructions 356 positioned on the front surface 300 of the controller body. The instructions may be printed on an adhesive substrate and affixed to the controller or may be printed or embossed directly on the controller body. The set of instructions 356 provides guidance as to how to couple the plurality of connector interfaces 34A-34I and 302A-302F to respective connectors associated to bathing unit components. Optionally the set of instructions 356 may also include information regarding the current/voltage available at each connector interface 34A-34I and 302A-302F.

Optionally still, the set of instructions 356 also includes information on the error codes displayed in the error diagnostic window 304 and provide an indication of what to do when various codes are displayed.

Advantageously, the set of instructions 356 regarding which connectors should be connected to which spa components reduces the likelihood of errors from plugging in spa components into incorrect connector interfaces. Consequently, a technician of low experience with spa controllers would still be likely to correctly connect the spa components to the controller by following the set of instructions 356 appearing on the front surface 300 of the controller body. In particular, by positioning the set instructions 356 in proximity to the controller interfaces, instead of in a user manual for example, it is more likely that the technician will follow those instructions.

In accordance with a specific implementation, at least some connector interfaces 34A-34I and 302A-302F include descriptive indicia providing guidance in locating corresponding connectors associated to bathing unit components. Such descriptive indicia may be used instead of the set of instructions 356 or concurrently therewith.

In a first specific example, the descriptive indicia include alpha-numeric characters providing an indication of the type of bathing unit components to be coupled to given connector interfaces. The controller 30 depicted in FIGS. 3*a*, 3*b* and 3*d* includes connector interfaces 34A-34I having descriptive indicia with alpha-numeric characters.

For example:

- Connector interfaces 34*a* and 34*h* have descriptive indicia "AUX1" and "AUX2" indicating that the connector interfaces are for connection to auxiliary modules. Such auxiliary modules may include, without being limited to, video equipment, computer, cooling system, external lighting system, waterfall and external fan.
- Connector interface 34*b* has descriptive indicia "CP" indicating that the connector interface is for connection to a circulation pump module.
- Connector interface 34*c* has descriptive indicia "O2" indicating that the connector interface is for connection to an ozonator module.
- Connector interfaces 34*d*, 34*e*, 34*f* have descriptive indicia "PUMP3", "PUMP2" and "PUMP1" respectively indicating that the connector interfaces are for connection to pump modules.
- Connector interface 34*g* has descriptive indicia "HEATER" indicating that the connector interface is for connection to a heating module.
- Connector interface 34*i* has descriptive indicia "AUDIO" indicating that the connector interface is for connection to an audio module.

In a second specific example, the descriptive indicia include color indicia providing an indication of the type of bathing unit component to be coupled to given connector interfaces. The controller 30 depicted in FIGS. 3*a*, 3*b* and 3*d* includes connector interfaces 34A-34I and 302A-302F having descriptive color indicia. The color indicia allow effecting connections between the plurality of connector interfaces and the connectors associated to bathing unit components on the basis of a color code. An advantage of using a color code to effect connections is that even a technician of no experience and poor reading skills can easily make the connections. Furthermore, on the basis of a color code connection errors can be very easily detected and corrected even by a technician of little or no experience.

In a third specific example, the controller 30 uses color indicia and alpha-numeric characters in combination to provide an indication of the bathing unit component to be coupled to given connector interface. The controller 30 depicted in FIGS. 3*a*, 3*b* and 3*d* includes connector interfaces 34D-34E and 34F having descriptive color indicia and alpha-numeric characters. The color indicia cannot be seen in the figures since they are in black and white however for the purpose of this example, connector interfaces 34E and 34F are yellow and connector interface 34D is red. In this particular example:

- The alpha-numeric characters "PUMP3", "PUMP2" and "PUMP1" indicate that the connector interfaces are for connection to pump modules.
- The yellow color indicia for connector interfaces 34E and 34F indicate that the connectors are rated for pumps up to 20 Amps.
- The red color indicia for connector interface 34D indicate that the connector interface is rated for a pump up to 15 Amps.

It will be appreciated that other suitable schemes for combining descriptive indicia to convey information, which will become apparent to the person skilled in the art in light of the present specification, may be used without detracting from the spirit of the invention.

Each one of the connector interfaces 34A-34I and 302A-302F, comprises a plurality of contact elements. In a specific implementation, the contact elements are electrically connected to electrical circuitry, such as a printed-circuit board or other suitable control circuit element, that is mounted in the controller 30 and that is adapted to convert the power received from the electric power source 29 into a particular voltage and/or current applied to each one of the contact elements.

The contact elements of the connector interfaces 34A-34I and 302A-302F are adapted to be electrically connected to a printed circuit board (not shown) positioned between the front surface and the back surface of the controller body. The printed circuit board receives power via service wiring 31 from a conventional electric power source 29. The printed circuit board includes a variety of electrical components and patterns of printed wiring conductor traces that interconnect the variety of electrical components and the service wiring 31. Each one of the contact elements of the connector interfaces 34A-34I and 302A-302F may be directly connected to a respective one of the printed conductor traces, for example, by a soldered connection, or any other suitable method known in the art. Alternatively, each contact element may be connected to a respective one of the printed conductor traces of the printed circuit board via a respective conductor wire extending from the contact element to the printed conductor trace. The printed circuit board is designed to either directly route, or convert and route directly or through a relay, the power received from service wiring 31 such as to achieve the particular voltage or current expected to be made available at each contact element of the connector interfaces 34A-34I and 302A-302F. In a specific non-limiting implementation, the service wiring 31 includes a first line "line 1", a second line "line 2", a Neutral and earth ground conductor connected to 120/240 V single phase supply system.

The printed circuit board includes a control circuit element connected to the variety of electrical components on the board and adapted to receive signals from various input devices of the spa system 10, such as the spa control panel 32 and various spa sensors 70 (shown in FIG. 2). The control circuit element is adapted to control the operation of the various electrical components of the printed circuit board on the basis of the signals received from the various input devices such as to enable or disable the particular voltage or current expected to be available at any one of the connector interfaces 34A-34I and 302A-302F. For example, in a typical interaction, a user of the spa enters commands via the spa control panel 32 in order to activate a particular spa component. The control circuit element, upon receiving signals generated by the control panel 32 on the basis of the entered commands, controls the various electrical components of the printed circuit board such as to enable the connector interfaces 34A-34I and 302A-302F associated with the particular spa component. Similarly, if a water level sensor was to generate a signal upon detecting an unacceptable water level in a particular spa component such as the pump 12 or the heating module 60 (shown in FIG. 2), the control circuit element, upon receiving the generated signal, could control the various electrical components of the printed circuit board such as to disable the voltage and/or current available at the contact elements of the connector interface associated with the pump 12 or the heating module 60.

In a specific example of implementation, as shown in FIG. 3*d*, the back surface and the front surface of the controller body are connected such as to form a first portion 380 and a second portion 382. The second portion 382 may be accessed independently from the first portion 380.

In a non-limiting implementation, a power connection interface 350 and a fuse connector interface 352 are positioned within the second portion 382. The power connection interface 350 includes a plurality of connectors adapted for receiving electric wires therein from service wiring 31. The control circuit mounted on the circuit board is positioned at least in part within the first portion 380.

Advantageously, by positioning the power connection interface 350 and a fuse connector interface 352 in the second portion and allowing the second portion 382 to be accessed independently from the first portion 380, a technician may effect the electrical service wiring and the fuses may be replaced in the second portion without accessing to the circuit board in the first portion. As such, the likelihood of damaging the control circuit positioned within the first portion 380 during servicing by a technician is reduced. In conventional controllers, there is typically a significant amount of wiring between the connectors and the printed circuit board. The large amount of wire does not permit for the mounting of connectors on a removable front panel. Since conventional controllers need to have a removable front panel to access the serviceable part, such as fuses and the input electrical power connections, the connectors need to be mounted elsewhere, namely on the peripheral edges of the unit.

In the embodiment described, by eliminating the need for a removable access panel in the first portion of the controller body by positioning the serviceable parts separately from the printed circuit board, the connector interfaces can easily be mounted on the front surface of the controller. Access to serviceable part, such as fuses and the input electrical power connections is provided in the second portion through an access panel. Therefore, a configuration of the type described above allows for connector interfaces to be positioned on the front surface of the controller body with a lower risk of potential damage during the servicing of the controller.

Optionally, a set of instructions 354 is provided describing how connections to the power connection interface 350 and the fuse connector interface 352 are to be made. Such instructions may also include information elements such power requirements, fuse type/capacity, manner in which to connect the service wiring amongst others. The instructions are preferably positioned in proximity to the power connection interface 350 and a fuse connector interface 352 such as to facilitate reference thereto by the technician. As such, the likelihood of effecting an incorrect connection is reduced. In the embodiments illustrated in FIG. 3*b*, a set of instructions 354 is positioned next to the power connection interface 350 and the fuse connector interface 352 as shown in FIG. 3*b* or may be positioned on the inside surface of the access panel 360. The instructions may be printed on an adhesive substrate and affixed to the controller or may be printed or embossed directly on the controller body.

Figure 5:
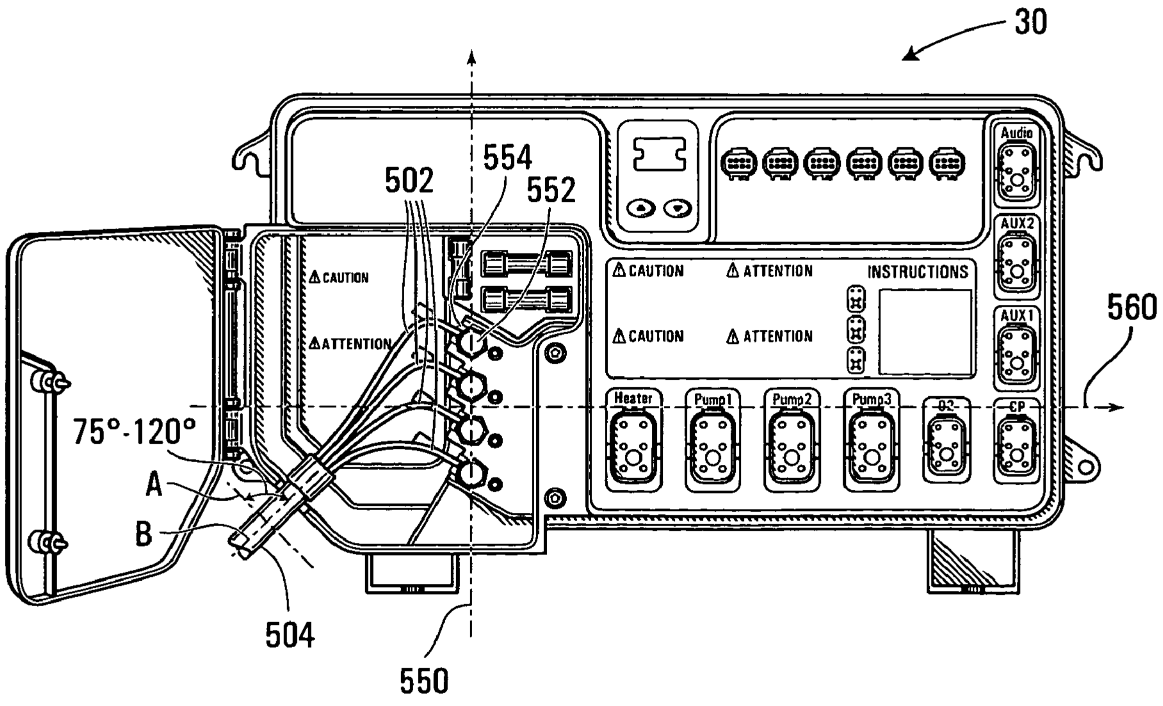
FIG. 5 shows the bathing controller shown in FIG. 3*b* showing the terminal block having a set of electrical wires connected thereto in accordance with a specific example of implementation of the present invention.

In a non-limiting example of implementation, the power connection interface 350 includes a plurality of connectors 552 generally aligned along a first axis 550 as shown in FIG. 5. Each connector 552 is associated to a respective connection path 554 through which respective wires 502 pass in order to effect electrical connections. In the non-limiting example of implementation shown in FIG. 5, the connection paths 554 are positioned at an angle from a second axis 560, where the second axis 560 is generally perpendicular to the first axis 550. Advantageously, positioning the plurality of connection paths 554 at an angle from the second axis 560, rather than substantially aligned therewith, allows for greater ease in effecting the electrical connections through wires 502.

More specifically, in the configuration depicted in FIG. 5, positioning the plurality of connection paths 554 at an angle from the second axis 560 allows electrical wires to be bent only once from the entrance of the electrical wires in the controller body to the connectors 552. The increased play generated by the single bend, will facilitate the manipulation of a large wire gage and ease the connection process. In systems where the connection paths are aligned with axis 560, at least two bends of the electrical wire are required in order to make some adjustment to reach the connector through the connection paths unless each wire included in the input cable is of the precisely exact length, witch is difficult to achieve with large multiple wire gage.

It will be appreciated that the angle between the connection paths 554 and the second axis 560 may vary depending on implementations and that such alternative implementations fall within the scope of the present application. In specific implementations, angles between about 25° and about 75° from the second axis 560 have been found to yield improved ease of connection. It will also be appreciated that the angle between the connection paths 554 and the second axis 560 may vary from one connection path to another and that such alternative implementations fall within the scope of the present application.

The second portion 382 includes an access panel 360 providing access to the inside of the second portion 382. In a specific example of implementation, the access panel 360 is moveable between a closed position and an open position. Various configurations are possible for the access panel 360. In a first example, the access panel is moveable between a closed position, as shown in FIG. 3*a*, and an open position, as shown in FIG. 3*b*, through a hinge member 358. In a second example (not shown in the figures), the access panel is releasably fastened to the controller body by a set fasteners. Any suitable fasteners may be used here without detracting from the spirit of the invention. In a third example, as shown in FIGS. 3*a* and 3*b*, the access panel is releasably fastened to the controller body by a set fasteners 310 in addition to a hinge member 358 through which the access panel is moveable between a closed position and an open position. In yet another example, the access panel is adapted to slidingly engage a guiding path in the controller body in order to move the panel between a closed position and an open position. It will be readily apparent to the person skilled in the art that other suitable configurations for the access panel are possible. Optionally, the second portion 382 includes a sealing member (such as a gasket or other means) to prevent water from entering the inside of the second portion 382 under normal controller 30 use. The sealing member is usually position about the periphery of the access panel 360. It will be appreciated that in certain alternative implementations, the access panel 360 may be totally absent and that in such implementations the electrical connectors 350 and the fuses 352 are exposed.

In a specific implementation, the first portion 380 is sealed such as to prevent access thereto by a technician. The first portion contains at least part of the circuit board, which is in communication with the power connection interface 350 and with the plurality of connector interfaces, and on which is mounted the control circuit.

The control circuit is mounted on a circuit board in communication with the power connection interface 350 and with the plurality of connector interfaces. The circuit board is positioned at least in part within the first portion 380.

In a specific example of implementation, the first portion is sealed such as to reduce the likelihood of water entering the first portion. The seal may create a water resistant or waterproof enclosure such that the control circuit positioned within the first portion is not put into contact with water. This is particularly advantageous since the controller 30 is used in the context of a spa system or other bathing system.

The first portion 380 may be permanently sealed or releasably sealed. In a first specific implementation, the first portion 380 is sealed by providing a key-type latch that provides access to the first portion to the holder of the appropriate key. In a second specific implementation, the first portion is sealed with an epoxy adhesive or a gasket material along at least part of its periphery. In a third specific implementation, the first portion is sealed with a set of fasteners such as screws, bolts and nuts, or any other suitable type of mechanical fastener. It will be readily apparent to the person skilled in the art that other suitable methods for sealing the first portion 380 may be used here without detracting from the spirit of the invention.

As shown in the figures, the plurality of connector interfaces 34A-34I and 302A-302F are positioned on the first portion 380.

Those skilled in the art will appreciate that various modifications and refinements can be made to the embodiments presented above without detracting from the scope of the present invention.

It is to be understood that the functionality of the control circuit element could be implemented by any suitable hardware and/or hardware/software combination without departing from the spirit and scope of the present invention. In a non-limiting example, the control circuit element is in the form of a microprocessor. In addition, it will also be appreciated that the control circuit element could be implemented by other suitable circuitry, including, by way of example only, an application-specific integrated circuit (ASIC), or discrete logic circuitry.

The above description of the embodiments should not be interpreted in a limiting manner since other variations, modifications and refinements are possible within the spirit and scope of the present invention. The scope of the invention is defined in the appended claims and their equivalents.

The invention claimed is:

1. A controller for controlling bathing unit components in a bathing unit system, said controller comprising:

a. a controller body having:

i. a back surface;

ii. a front surface generally opposed to said back surface, said front surface including a plurality of connector interfaces, wherein at least some connector interfaces in said plurality of connector interfaces are for engaging complementary connectors associated with respective bathing unit components;

iii. at least one other connector interface for engaging a complementary connector associated with an input device in the bathing unit system, in use said at least one other connector interface receiving signals originating from the input device in the bathing unit system;

iv. an enclosure defining a space between said back surface and said front surface;

b. an electronic circuit board positioned at least in part within said enclosure, said electronic circuit board including a control circuit, in use said control circuit being responsive to signals originating from the input device in the bathing unit system for selectively providing electrical power to bathing unit components connected through said at least some connector interfaces in said plurality of connector interfaces.

2. A controller as defined in claim 1, wherein said electronic circuit board includes printed conductor traces, at least one of said connector interfaces including a conductive member establishing a direct contact with the printed conductor traces.

3. A controller as defined in claim 2, wherein the direct contact is established through a soldered connection between the printed conductor traces and the conductive member of said at least one of said connector interfaces.

4. A controller as defined in claim 1, said controller further comprising a set of instructions positioned on said front surface of said controller body, said set of instructions providing guidance as to how to couple said plurality of connector interfaces to respective connectors associated to bathing unit components.

5. A controller as defined in claim 1, wherein said back surface and said front surface are connected such as to form a first portion and a second portion, wherein said second portion may be accessed independently from the first portion.

6. A controller as defined in claim 5, wherein said second portion includes an access panel providing access to the second portion.

7. A controller as defined in claim 6, wherein said access panel is moveable between a closed position and an open position.

8. A controller as defined in claim 7, wherein said access panel is moveable between a closed position and an open position through a hinge member.

9. A controller as defined in claim 6, wherein said access panel is releasably fastened by fasteners such as to provide access to the second portion.

10. A controller as defined in claim 5, wherein said first portion is sealed such as to prevent access thereto by a technician.

11. A controller as defined in claim 5, wherein the first portion is sealed such as to reduce the likelihood of water entering the first portion.

12. A controller as defined in claim 5, wherein said controller comprises a power connection interface positioned within the second portion.

13. A controller as defined in 12, wherein said power connection interface includes at least one fuse connector.

14. A controller as defined in 12, wherein said power connection interface includes a plurality of connectors adapted for receiving electric wires.

15. A controller as defined in 14, wherein said plurality of connectors are generally aligned along a first axis, each connector in said plurality of connectors being associated to a respective connection path through which respective wires can pass in order to effect electrical connections with the connectors, the connection paths being positioned at an angle from a second axis, wherein the second axis is generally perpendicular to the first axis.

16. A controller as defined in claim 12, wherein said electronic circuit board is in communication with the power connection interface and with said plurality of connector interfaces, said electronic circuit board being positioned at least in part within the first portion.

17. A controller as defined in claim 5, wherein at least some of said plurality of connector interfaces are positioned on said first portion.

18. A controller as defined in claim 17, wherein said control circuit includes printed conductor traces, at some of said connector interfaces establishing a direct contact with the printed conductor traces.

19. A controller as defined in claim 1, wherein at least some connector interfaces of said plurality of connector interfaces include descriptive indicia, the descriptive indicia providing guidance in locating corresponding connectors associated to bathing unit components.

20. A controller as defined in claim 19, wherein the descriptive indicia include alpha-numeric characters.

21. A controller as defined in claim 19, wherein the descriptive indicia include color indicia.

22. A controller as defined in claim 21, wherein the color indicia allow effecting connections between the plurality of connector interfaces and the connectors associated to bathing unit components on the basis of a color code.

23. A controller as defined in claim 1, wherein said input device is a control panel.

24. A controller for controlling bathing unit components in a bathing unit system, said controller comprising:

a. a controller body including:
   i. a back surface;
   ii. a front surface generally opposed to said back surface;
   iii. an enclosure defining a space between said back surface and said front surface, the space including:
      1. a first portion having a first content;
      2. a second portion having a second content;
   iv. said front surface including an access panel moveable between a closed position and an open position for selectively providing access to the second portion, when in the open position the access panel exposing the second content without exposing the first content;

b. a plurality of connector interfaces positioned on said controller body, wherein at least some connector interfaces in said plurality of connector interfaces are for engaging complementary connectors associated with respective bathing unit components;

c. at least one other connector interface positioned on said controller body for engaging a complementary connector associated with an input device in the bathing unit system, in use said at least one other connector interface receiving signals originating from the input device in the bathing unit system;

d. an electronic circuit board positioned at least in part within said controller body, said electronic circuit board including a control circuit, in use said control circuit being responsive to the signals originating from the input device in the bathing unit system for selectively providing electrical power to bathing unit components connected through said at least some connector interfaces in said plurality of connector interfaces.

25. A controller as defined in claim 24, wherein said input device is a control panel.

26. A controller as defined in claim 24, wherein said access panel is moveable between a closed position and an open position through a hinge member.

27. A controller as defined in claim 24, wherein said access panel is releasably fastened by fasteners such as to provide access to the second portion.

28. A controller as defined in claim 24, wherein said first portion is sealed such as to prevent access thereto by a technician.

29. A controller as defined in claim 24, wherein the first portion is sealed such as to reduce the likelihood of water entering the first portion.

30. A controller as defined in claim 24, wherein said controller comprises a power connection interface positioned within the second portion.

31. A controller as defined in 30, wherein said power connection interface includes at least one fuse connector.

32. A controller as defined in 30, wherein said power connection interface includes a plurality of connectors adapted for receiving electric wires.

33. A controller as defined in 32, wherein said plurality of connectors are generally aligned along a first axis, each connector in said plurality of connectors being associated to a respective connection path through which respective wires can pass in order to effect electrical connections with the connectors, the connection paths being positioned at an angle from a second axis, wherein the second axis is generally perpendicular to the first axis.

34. A controller as defined in claim 30, wherein said electronic circuit board is in communication with the power connection interface and with said plurality of connector interfaces, said electronic circuit board being positioned at least in part within the first portion.

35. A controller as defined in claim 24, wherein at least some of said plurality of connector interfaces are positioned on said first portion.

36. A controller for controlling bathing unit components in a bathing unit system, said controller comprising:

a. a controller body having:
   i. a back surface;
   ii. a front surface generally opposed to said back surface, said front surface including a plurality of connector interfaces, wherein at least some connector interfaces in said plurality of connector interfaces are for matingly engaging complementary connectors associated with respective bathing unit components;
   iii. at least one other connector interface for engaging a complementary connector associated with a sensor in the bathing unit system, in use said at least one other connector interface receiving control signals originating from the sensor in the bathing unit system;
   iv. an enclosure defining a space between said back surface and said front surface;

b. an electronic circuit board positioned at least in part within said enclosure, said electronic circuit board including a control circuit, in use said control circuit being responsive to the control signals originating from the sensor in the bathing unit system for selectively providing electrical power to bathing unit components connected through said at least some connector interfaces in said plurality of connector interfaces.

37. A controller for controlling bathing unit components in a bathing unit system, said controller comprising:

a. a controller body including:
   i. a back surface;
   ii. a front surface generally opposed to said back surface;
   iii. an enclosure defining a space between said back surface and said front surface, the space including:
      1. a first portion having a first content;
      2. a second portion having a second content;
   iv. said front surface including an access panel moveable between a closed position and an open position for selectively providing access to the second portion, when in the open position the access panel exposing the second content without exposing the first content;

b. a plurality of connector interfaces positioned on said controller body, wherein:

i. at least some connector interfaces in said plurality of connector interfaces are for matingly engaging complementary connectors associated with respective bathing unit components;

ii. at least one other connector interface in said plurality of connector interfaces is for engaging a complementary connector associated with a sensor in the bathing unit system, in use said at least one other connector interface receiving control signals originating from the sensor in the bathing unit system;

c. an electronic circuit board positioned at least in part within said controller body, said electronic circuit board including a control circuit, in use said control circuit being responsive to the control signals originating from the sensor in the bathing unit system for selectively providing electrical power to bathing unit components connected through said at least some connector interfaces in said plurality of connector interfaces.

* * * * *